US009010793B1

(12) United States Patent
Lindholm et al.

(10) Patent No.: US 9,010,793 B1
(45) Date of Patent: Apr. 21, 2015

(54) MOTORCYCLE FOOTPAD STRESS RELIEF MOUNTINGS AND CONTROLS

(71) Applicant: The Trike Shop, Inc., White Bear Lake, MN (US)

(72) Inventors: Douglas A. Lindholm, Lake Elmo, MN (US); Michael P. Nielsen, Cedar, MN (US)

(73) Assignee: The Trike Shop, Inc., White Bear Lake, MN (US)

( * ) Notice: Subject to any disclaimer, the term of this patent is extended or adjusted under 35 U.S.C. 154(b) by 246 days.

(21) Appl. No.: 13/781,995

(22) Filed: Mar. 1, 2013

Related U.S. Application Data

(60) Provisional application No. 61/608,242, filed on Mar. 8, 2012.

(51) Int. Cl.
*B62J 25/00* (2006.01)
*G05G 1/36* (2008.04)
*B23P 19/04* (2006.01)
*G05G 1/46* (2008.04)

(52) U.S. Cl.
CPC . *G05G 1/36* (2013.01); *B23P 19/04* (2013.01); *G05G 1/46* (2013.01)

(58) Field of Classification Search
USPC .......... 180/218, 219, 315; 280/291, 293, 294; 74/564
See application file for complete search history.

(56) References Cited

U.S. PATENT DOCUMENTS

| 4,181,190 | A * | 1/1980 | Yang | 180/219 |
| 6,786,312 | B1 * | 9/2004 | Osborne | 192/13 R |
| 6,945,376 | B1 * | 9/2005 | Hunter | 192/99 S |
| 7,040,442 | B2 * | 5/2006 | McWhorter | 180/219 |

* cited by examiner

*Primary Examiner* — Toan To
(74) *Attorney, Agent, or Firm* — Peter J. Ims; Westman, Champlin & Koehler, P.A.

(57) ABSTRACT

An adapter kit for motorcycles, particularly touring motorcycles moves the operator's foot pad forwardly and downwardly to increase the included angle between the upper leg and lower leg at the knee, as well as the angle at the ankle for operating the respective brake and shift controls. The kit includes adapter brackets to move the foot pads forwardly and downwardly relative to the position of the footpad as originally assembled. The kit also includes modified linkages to maintain a correct relationship between the respective control levers and the footpads. The linkage for the shift lever is modified to provide a pivot to accommodate the change in location, and yet maintain easily operated shifting.

18 Claims, 8 Drawing Sheets

MOTORCYCLE FOOTPAD STRESS RELIEF MOUNTINGS AND CONTROLS

CROSS REFERENCE TO RELATED APPLICATION

The present application claims the benefit of U.S. Provisional Patent Application Ser. No. 61/608,242 that was filed on Mar. 8, 2012, the contents of which are incorporated by reference in its entirety.

BACKGROUND

The present disclosure relates to an adapter kit for motorcycles to move the footrest pads on both sides of the motorcycle downwardly and forwardly to increase the included angle between the upper leg and lower leg at the knee for more comfort during a motorcycle ride while maintaining the relationship between the foot pad and the respective control for the brake and the gear shifter on each side of the motorcycle.

Existing motorcycles are standardized with footrest pads on each side of the motorcycle with the brake pedal on the right hand side of the motorcycle and the shift lever on the left hand side. In the large touring model motorcycles, such as, but not limited to, the Honda G1800 Goldwing, the footrests are positioned relative to the operator seat so that the leg of a rider, particularly a rider with relatively long legs have a reduced included angle between the upper leg and the lower leg at the knee. Due to the reduced included angle between the upper leg and the lower leg at the knee, during long rides and touring the rider can feel discomfort in both the knee and ankle.

SUMMARY

The present disclosure relates to an adapter kit for motorcycles, particularly touring motorcycles that move the operator's foot pad forwardly and downwardly to increase the included angle between the upper leg and lower leg at the knee, as well as the angle at the ankle for operating the respective brake and shift controls. The kit includes adapter brackets to move the foot pads forwardly and downwardly relative to the position of the footpad as originally assembled. The kit also includes modified linkages to maintain a correct relationship between the respective control levers and the footpads. The linkage for the shift lever is modified to provide a pivot to accommodate the change in location, and yet maintain easily operated shifting.

DESCRIPTION OF PREFERRED EMBODIMENTS

Figure 1:
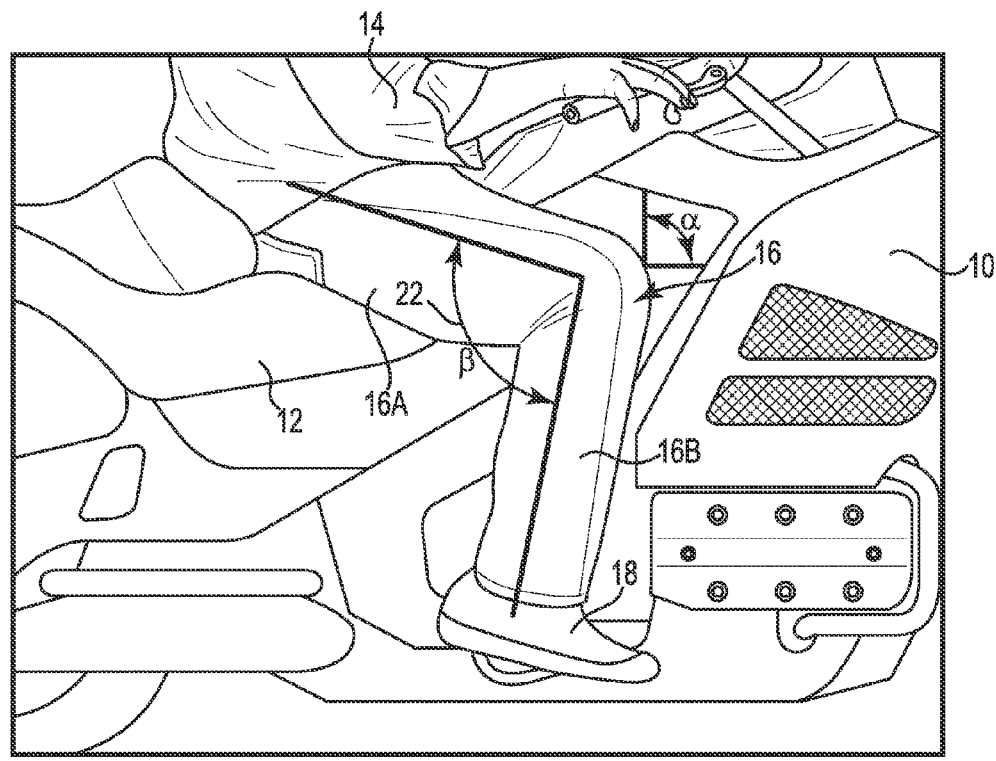
FIG. 1 is a side elevational view of an existing touring motorcycle showing a typical position of an operator's leg.
Figure 3:
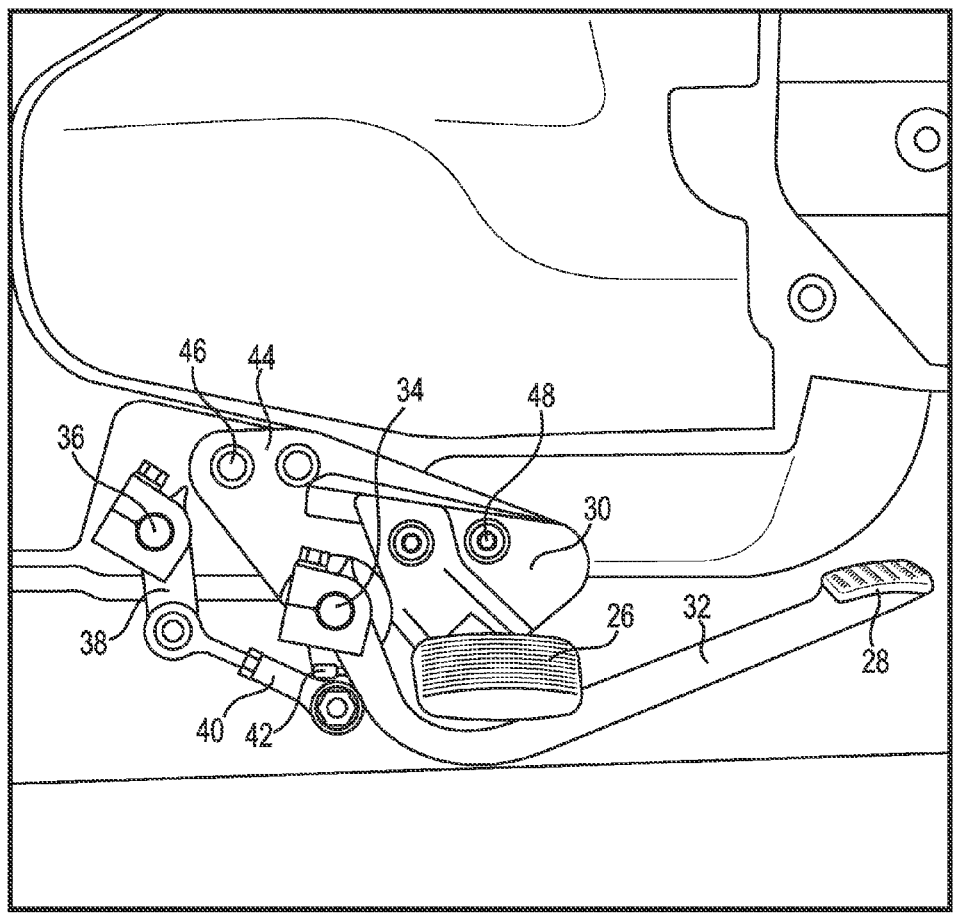
FIG. 3 is a side perspective view of the adapter of the present disclosure installed on a brake linkage of the right hand side of the motorcycle.

In FIG. 1, a motorcycle 10 is illustrated fragmentarily, and the standard seat 12 of this touring motorcycle is shown supporting a rider 14. The rider's leg 16 is extending forwardly and downwardly so that a shoe 18 of the rider is supported on a foot pad shown at 26 in FIG. 3, with the front of the heel of the shoe against the foot pad 26. The included angle $\beta$ between the upper leg 16A and the lower leg 16B is illustrated as at 22, extending between lines representing the center line of the upper and lower legs. This representation is of the factory installed position of the foot pad 26, and the included angle $\beta$ of the leg can be seen along with a position of the knee cap relative to the motorcycle as represented by the symbol $\alpha$. FIG. 1 illustrates the right hand side or brake pedal side of the motorcycle 10, but the left hand side or shift lever side has the foot pad positioned at the same location relative to the seat 12.

Figure 2:
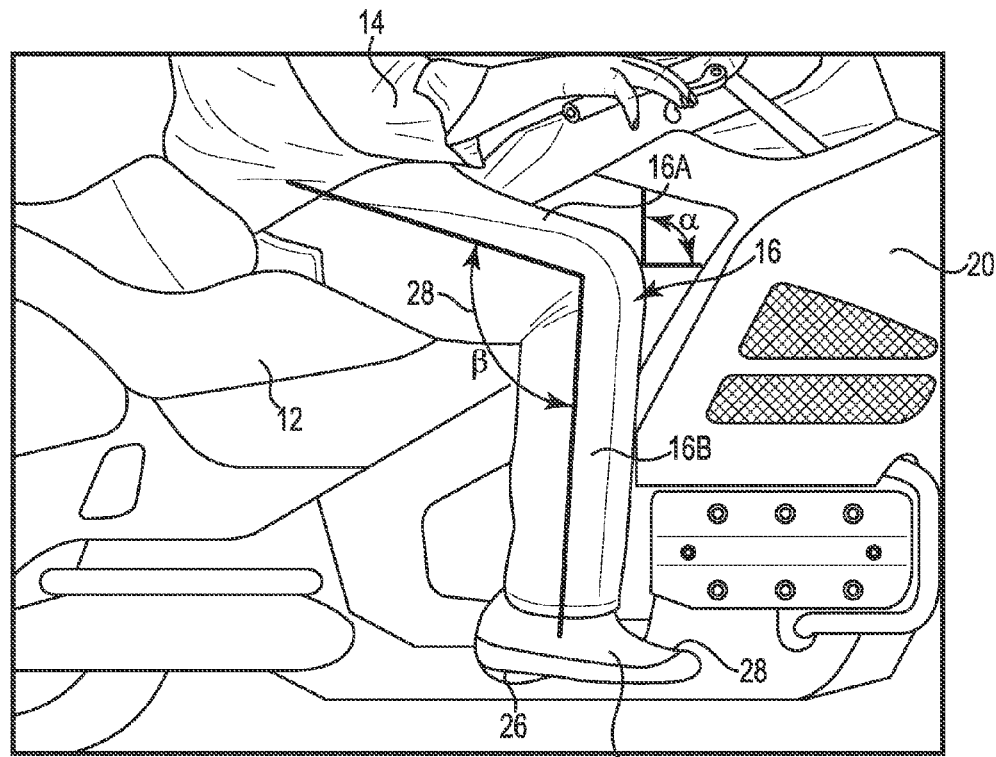
FIG. 2 is a side elevational view of the motorcycle of claim 1 with the right side portion of the kit of the present disclosure installed.

Referring to FIG. 2, a motorcycle 20 of the same make and model as that shown in FIG. 1 also includes the seat 12, with a rider 14 in position on the seat. The rider's leg 16 in this instance includes an upper portion 16A and lower portion 16B, positioned on a foot pad 26 of the adapter kit of the present device, showing that the foot pad 26 has been moved using the adapter kit of the present disclosure to move the foot pad essentially 3 inches forwardly and 1 inch downwardly, along with moving the brake pedal and the linkage to the brake actuating arm the same amount to maintain a relationship between the foot pad and the pad 28 of the brake pedal. While the adapter kit is illustrated moving the foot pad about 3 inches forwardly and about 1 inch downwardly, the adapter kit can be designed to move the foot pads any desired distance from the factory mounted foot pad position.

The included angle $\beta$ of the leg 16 between the upper leg 16A and lower leg 16B that is indicated with the double arrow 28 is increased by in the range of 6 to 8 degrees from that shown and indicated with double arrows 22 in FIG. 1, and results in much greater comfort for long distance rides on a touring type motorcycle. While a change in the angle $\beta$ is illustrated as being between about 6 degrees and 8 degrees, the adapter kit can be utilized to change the angle $\beta$ to be between 4 degrees and 15 degrees. The angle will change with the length of the rider's legs, but the change makes a significant difference in comfort for long rides. Also the knee cap is lowered relative to the motorcycle as illustrated by the lines defined by the symbol $\alpha$.

Utilizing the adaptor kit, the ankle is in a more natural position where the foot is substantially flat or parallel to ground as illustrated in FIG. 2 relative to the position of the ankle in FIG. 1 where the toe is lower than the heal of the foot. Allowing the ankle to be in a natural relaxed position over long rides also reduces the amount of fatigue and pain in the ankle.

The kit assembly, for mounting the foot pad at 26 to the position shown in FIG. 2 is illustrated in FIGS. 3-6. The standard mounting flange 30 of the conventional factory delivered motorcycle is shown, and the foot pad 26 is mounted on this flange 30 in the same manner as assembled in the factory. Additionally, the brake pad arm 32 that has the pad 28 at the outer end thereof is mounted in the same position on the flange 30 about a pivot bolt 34, which is clamped in place with a clamp having legs that define a bore that is constricted to secure the brake arm 32 to the pivot bolt 34.

The brake actuating shaft 36 that is standard on the motorcycle 20 also has a standard arm 38, with a link 40 between an arm 42 that is actuated by the brake arm movement. This will result in actuating the brake when the brake arm 32 is depressed. A length of the link 40 can be manipulated through a threaded engagement of a first part of the link 40 with a second part of the link 40 to adjust the sensitivity of the brake relative to the movement of the brake arm 32.

In order to move the foot pad 26 downwardly and forwardly a desired amount, an adapter bracket 44 is utilized, and is made to have openings near an upper rear side that will permit mounting the adapter bracket 44 in the same bolt holes as the standard flange 30. These bolt holes are shown at 46. The standard original flange 30 is then bolted with bolts 48 in the end suitable threaded openings in the adapter bracket 44.

Figure 4:
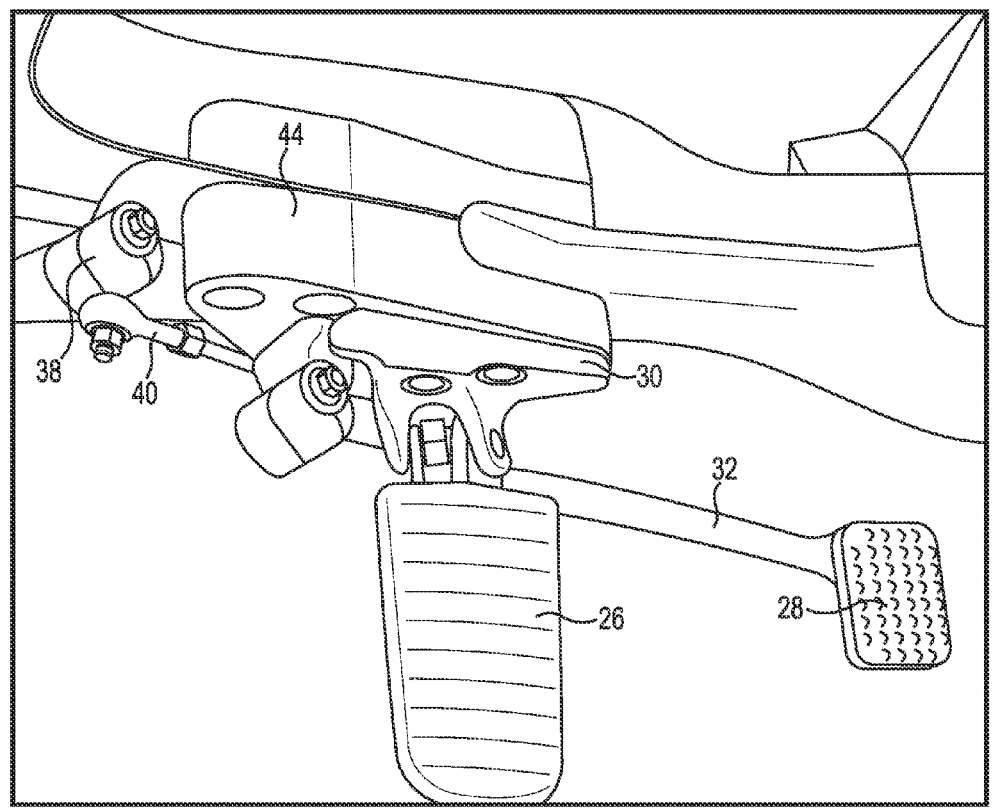
FIG. 4 is a top perspective view of the installation of FIG. 3.
Figure 5:
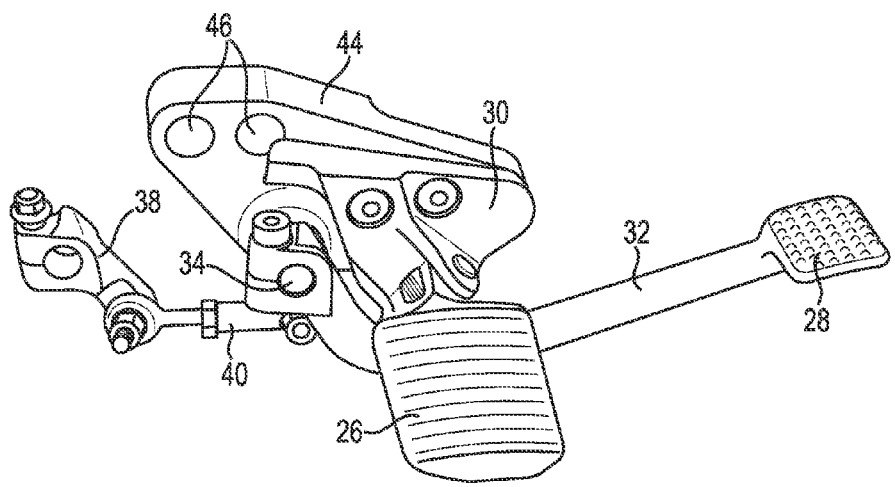
FIG. 5 is a view of the adapter and linkage of FIG. 3 removed from the motorcycle.
Figure 6:
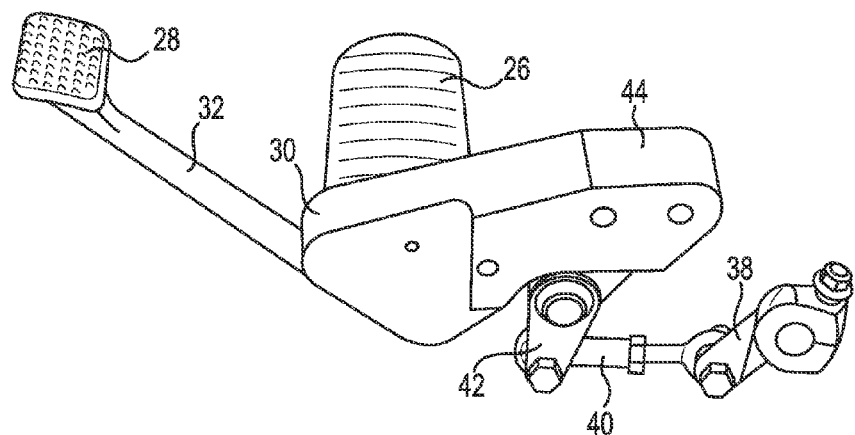
FIG. 6 is a view of the adapter of FIG. 5 from the opposite side of the adapter.
Figure 7:
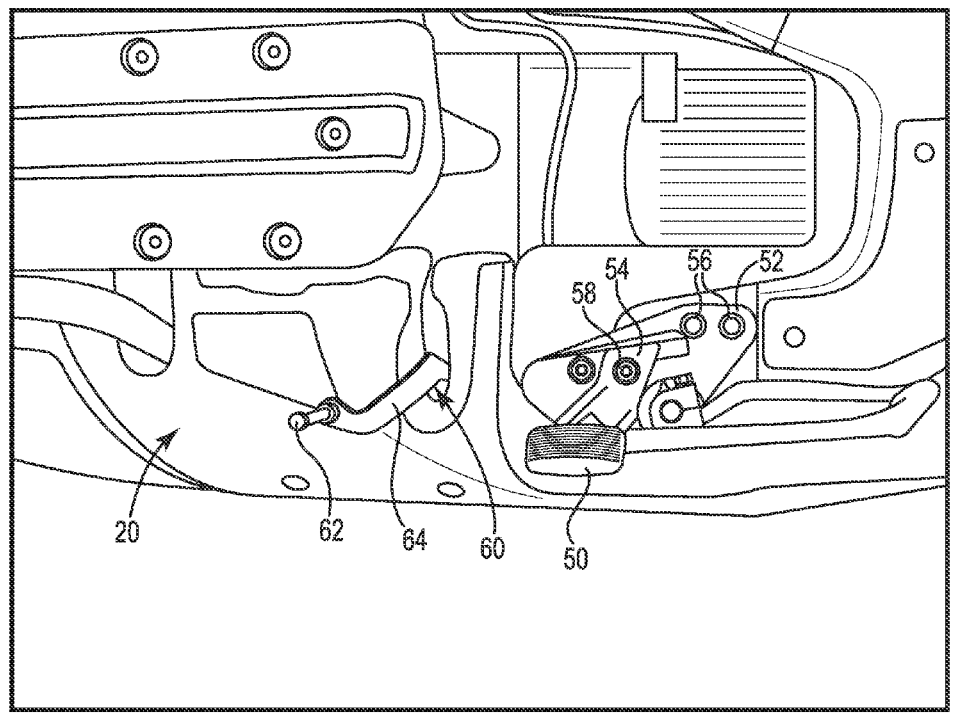
FIG. 7 is a side view of the shift lever adapter on the left hand side of the motorcycle.
Figure 8:
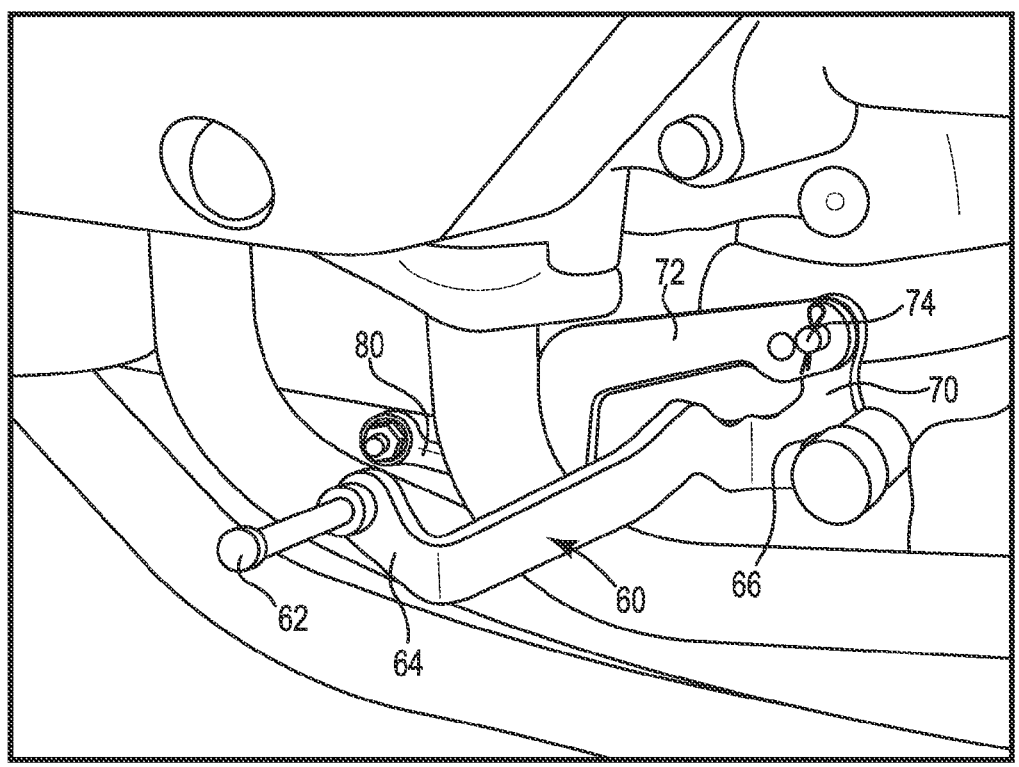
FIG. 8 is a perspective view of the adapter portion of FIG. 7.
Figure 9:
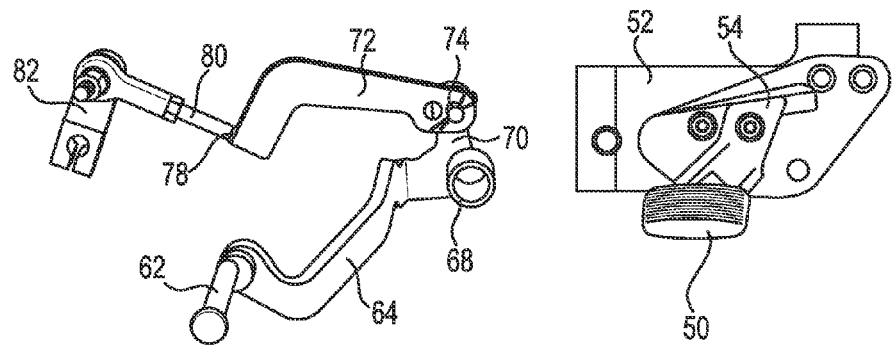
FIG. 9 is a view of the adapter and shift lever linkage shown in FIGS. 7 and 8 removed from the motorcycle.
Figure 10:
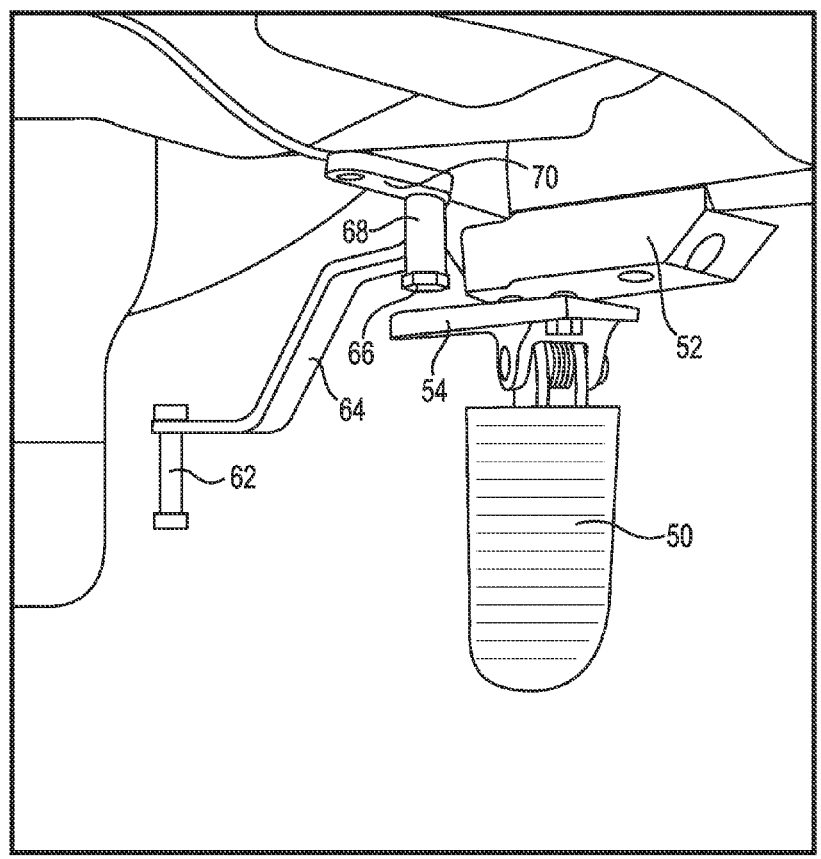
FIG. 10 is a top plan view of the shift lever adapter of FIG. 7.
Figure 11:
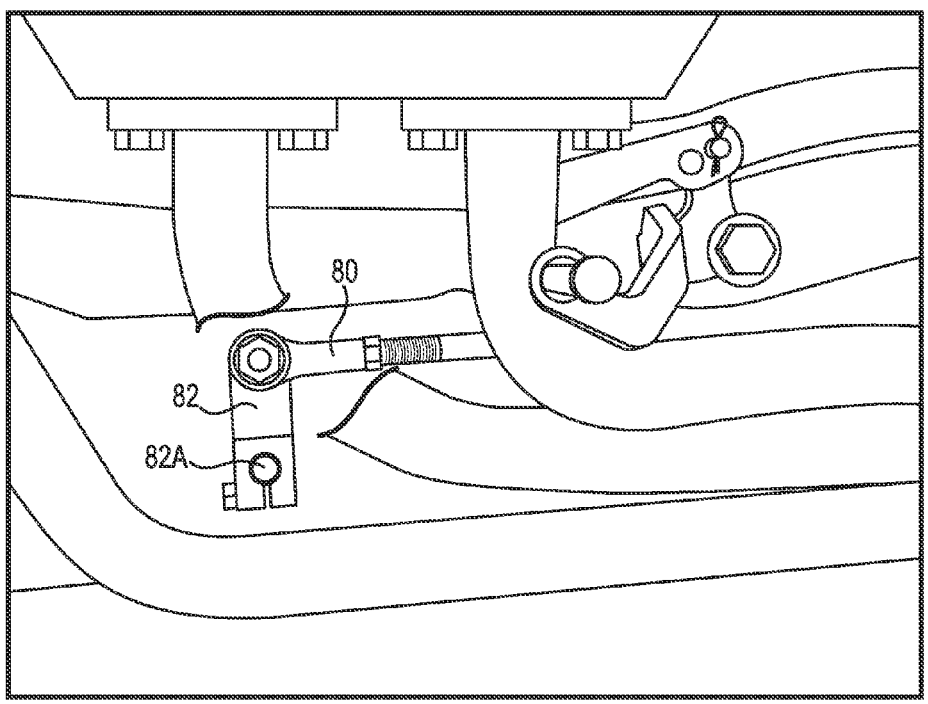
FIG. 11 is a perspective view of the shift linkage connected to a lever on the transmission shifting shaft.

FIG. 4 shows the adapter plate mounted on the side of the motorcycle 20, and it spaces the foot pad 26 and the brake pedal 28 outwardly slightly, but moves it, again, forwardly 3 inches, and downwardly 1 inch in the desired location. However, the present disclosure is not limited to moving the foot pad 26 and the brake pedal 28 forwardly 3 inches and downwardly 1 inch relative to the factory installed location of the foot pad 26 and the brake pedal 28.

FIGS. 7-11 illustrates the left side of the motorcycle 20 with the adapter kit of the present disclosure installed. The adapter kit moves the foot pad 50 for the left side and the gear shift peg 62 of the motorcycle 20 downwardly 1 inch, and forwardly 3 inches, as well as moving it outwardly from its original mounting at the factory. While moving the foot pad 50 and the gear shift downwardly 1 inch, and forwardly 3 inches is disclosed, the adapter kit can be used to move the gear shift peg 62 and the foot pad different distances. Moving the gear shift peg 62 requires a change in the shift lever linkage, which was operated by a foot through a lever directly attached to the transmission gear shifter shaft.

The gear shift adapter kit includes the adapter plate 52 that in turn mounts a standard foot pad support flange 54 used on the standard factory delivered motorcycle, and the flange 54 mounting hole are indicated at 56 and used for mounting the adapter plate 52 in position. The adapter bracket 52 spaces the mounting flange 54 for the foot pad 50 outwardly sideways, and the mounting flange 54 is mounted to the adapter bracket 52 with bolts 58 that thread into provided holes in the adapter bracket 52. Utilizing the adapter bracket 52 causes the foot pad 50 to be spaced about three inches forwardly and one inch down so that the angle of the leg of the rider is as shown in FIG. 2, but for the left leg.

In order to accommodate shifting, a linkage 60 is provided for mounting components of the shift lever. These include the foot operated peg 62 mounted on the end of an arm 64 that is pivotally mounted on a pivot bolt 66. The foot pad 50 is then spaced about 3 inches forwardly and 1 inch The pivot bolt 66 threads into an existing hole on the motorcycle, and the linkage has a hub 68 that pivots on the pivot bolt 66. An arm 70 is connected to the hub 68 which acts as a lever arm to which a link 72 is pivotally mounted with a pivot pin 74 to the lever 70. The link 72 extends forwardly, and has an offset or laterally extending portion 78 that mounts an adjustable link 80 which in turns mounts onto a standard lever 82. The lever 82 includes a clamp that connects to the shifter shaft of the transmission 82A (see FIG. 11) for permitting the shifting of gears in the standard manner.

The lowering and moving forward of the foot supports 26 and 50 from the factory positions relives stress in the leg and knee joint, as well as the ankle joint of a rider. The parts can be supplied as a kit comprising an adapter plate 44 and 52 that has a first set of holes in the plate near an upper and reward side that receive fasteners to mount the adapter plate with the fastener in the original foot support mounting plate threaded holes, and which has a second set of holes located downwardly and forwardly from the first set and which receive fasteners from the holes in the foot support, so the foot support is downwardly and forwardly from the factory position. In addition the kit includes modified linkage for the foot operated control to operate the motorcycle control shafts for the brake and gear shift which move the actuators downwardly and forwardly to position the actuators by the relocated foot supports for operation. In the case of the brake controls, the brake lever can be mounted directly to the adapter plate and the gear shift linkage can be pivoted on the motorcycle frame of engine block and coupled to the gear shift control shaft on the motorcycle transmission.

The disclosure includes using the kit for a method of reducing stress in the leg of a rider of a motorcycle in the form in which the motorcycle comes from the factory. The method is to relocate the foot supports from the factory position downwardly and forwardly relative to the seat and to provide modified linkage that permits operation f the foot controls associated with the respective foot support, namely the brake and the gear shift.

Although the present invention has been described with reference to preferred embodiments, workers skilled in the art will recognize that changes may be made in form and detail without departing from the spirit and scope of the invention.

What is claimed is:

1. A method of reducing stress in a knee joint of a motorcycle rider of a motorcycle with left and right foot support pads at first locations on a motorcycle as received from a factory, the method comprising:
   providing adapter brackets for moving the left and right foot support pads forwardly and downwardly from the first locations to second locations; and
   providing linkages for operating foot controls associated with the foot support pads to permit operation of such controls from the second locations.

2. The method of claim 1 and further comprising:
   detaching the left and right foot support pads from the motorcycle; and
   attaching left and right adapter brackets to the motorcycle at the first locations.

3. The method of claim 2 and further comprising attaching the left and right foot support pads to the left and right adapter brackets such that the left and right foots support pads are positioned in a second locations forwardly and downwardly relative to the first locations.

4. The method of claim 3 and wherein the left and right foot supports are moved about three inches forward and one inch down into the second locations relative the first locations.

5. The method of claim 4 and wherein an included angle defined by the upper leg and the lower leg at a knee joint is increased by a range of about 4 degrees to 15 degrees.

6. The method of claim 4 and wherein an included angle defined by the upper leg and the lower leg at a knee joint is increased by a range of about 6 degrees to 8 degrees.

7. The method of claim 1 and further comprising attaching a modified braking linkage to a right side of the motorcycle between a brake lever and a braking shaft.

8. The method of claim 7 and further comprising adjusting a length of the modified braking linkage to adjust the responsiveness of a braking system.

9. The method of claim 1 and further comprising attaching a shifting linkage having foot control to a frame of the motorcycle and to a shifter shaft of a transmission attached to the motorcycle and wherein the shifting linkage includes a pivoting action between the two attached ends of the linkage.

10. The method of claim 9 and further comprising adjusting a length of the linkage to adjust a responsiveness of shifting of gears within the transmission.

11. A kit for relocating a foot support mounted with mounting fasteners in provided first holes on at least one side of a motorcycle, the kit comprising:
 an adapter bracket having second holes for fasteners at an upper rearward side to mount the adapter plate on the motorcycle with fasteners in the first holes, the adapter plate having third holes for mounting a foot support spaced downwardly and forwardly from the second holes; and
 control linkages connectable to actuated devices on the motorcycle and operable by a foot supported on a foot support supported with fasteners in the third holes.

12. The kit of claim 11 and where in the kit comprises:
 a first adapter plate for attaching to the first holes in a left side of the motorcycle; and
 a second adapter plate for attaching to the first holes a right side of the motorcycle and wherein the first and second plates include the second holes and the third holes.

13. The kit of claim 12 and wherein the third holes have threaded bores.

14. The kit of claim 11 and further comprising a brake arm pivotally attached to the right foot support.

15. The kit of claim 14 and further comprising a linkage connecting the brake arm to a brake actuating shaft, the linkage comprising:
 a first arm attached to the brake arm;
 a link having a first end pivotally attached to the arm and a second end; and
 a second arm attached to the brake actuating shaft and having the second end of the link attached thereto with a pivotal attachment.

16. The kit of claim 11 and further comprising a gear shifting control linkage for attaching to the motorcycle on a left side thereof, the gear shifting control linkage comprising:
 a shifting arm pivotally mounted to the motorcycle at a first end and having a second end; and
 a foot operating peg extending from proximate the second end of the shifting arm.

17. The kit of claim 16 and wherein the gear shifting control linkage further comprises:
 a hub non-rotatably attached to the first end of the shifting arm; and
 a lever arm attached to the hub.

18. The kit of claim 17 and wherein the gear shifting control linkage further comprises a link pivotally attached to the lever arm wherein the link includes a portion that includes an adjustable length to adjust a length of the gear shifting control linkage.

\* \* \* \* \*